(12) United States Patent
Lin et al.

(10) Patent No.: US 8,988,341 B2
(45) Date of Patent: Mar. 24, 2015

(54) CAMERA-ASSISTED MOTION ESTIMATION FOR APPLICATION CONTROL

(71) Applicant: Apple Inc., Cupertino, CA (US)

(72) Inventors: Yao-Chung Lin, Mountain View, CA (US); Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 13/631,263

(22) Filed: Sep. 28, 2012

(65) Prior Publication Data

US 2013/0328771 A1 Dec. 12, 2013

Related U.S. Application Data

(60) Provisional application No. 61/657,684, filed on Jun. 8, 2012.

(51) Int. Cl.
*G09G 5/00* (2006.01)
*G06F 1/16* (2006.01)

(52) U.S. Cl.
CPC ...... *G06F 1/1694* (2013.01); *G06F 2200/1636* (2013.01)
USPC ............................ 345/156; 345/157; 345/169

(58) Field of Classification Search
CPC ...... G06F 3/0346; G06F 3/038; G06F 3/1626
USPC .......................................... 345/156, 157, 169
See application file for complete search history.

(56) References Cited

U.S. PATENT DOCUMENTS

| 5,430,480 | A | 7/1995 | Allen et al. | |
|---|---|---|---|---|
| 7,692,688 | B2 | 4/2010 | Kurata | |
| 7,777,781 | B2 | 8/2010 | Helbing et al. | |
| 8,134,604 | B2 | 3/2012 | Fujita et al. | |
| 8,686,942 | B2 * | 4/2014 | Yamamoto | 345/157 |
| 2007/0002015 | A1 * | 1/2007 | Mohri et al. | 345/157 |
| 2008/0291298 | A1 * | 11/2008 | Kim et al. | 348/241 |
| 2009/0103810 | A1 * | 4/2009 | Echigo et al. | 382/190 |
| 2011/0157017 | A1 * | 6/2011 | Webb et al. | 345/158 |
| 2011/0199304 | A1 * | 8/2011 | Walley et al. | 345/158 |

* cited by examiner

*Primary Examiner* — Jennifer Nguyen
(74) *Attorney, Agent, or Firm* — Kenyon & Kenyon LLP

(57) ABSTRACT

Embodiments of the present invention generate estimates of device motion from two data sources on a computing device—a motion sensor and a camera. The device may compare the estimates to each other to determine if they agree. If they agree, the device may confirm that device motion estimates based on the motion sensor are accurate and may output those estimates to an application within the device. If the device motion estimates disagree, the device may alter the motion estimates obtained from the motion sensor before outputting them to the application.

29 Claims, 4 Drawing Sheets

200

300

CAMERA-ASSISTED MOTION ESTIMATION FOR APPLICATION CONTROL

CROSS-REFERENCE TO RELATED APPLICATIONS

The present invention benefits from priority of U.S. application Ser. No. 61/657,684, filed Jun. 8, 2012, entitled "Camera-Assisted Motion Estimation for Application Control," the disclosure of which is incorporated herein in its entirety.

BACKGROUND

Many consumer electronic devices use motion sensors, among other input devices, as operator control inputs for the devices. For example, the devices may include gyroscopes and/or accelerometers, which generate sensor data that the devices may use to determine its orientation in free space. An operator changes the device's orientation in space and, in doing so, intends to enter commands to the device. For example, for tablet computers, many gaming applications allow operators to tilt the tablet computer back and forth as a means to effect changes in game play. Similarly, for game consoles, an operator may manipulate game controllers in free space to affect game play. The devices interpret changes in the motion sensor as operator input changes various elements of game play accordingly.

The outputs of many motion sensors rely on the gravitational pull of the earth on components within the sensor. In many use cases, where the orientation of the gravitational pull is constant throughout use of the device, users may operate the device as they intend. In some use cases, however, shown in FIG. 1, the orientation of gravitational pull can vary during device operation, which can cause a device to register inputs that are different than an operator intends.

FIG. 1 illustrates a use case in which the orientation of gravitational forces varies about an operator during use of a device 100. When an operator is aboard a vehicle such as an airplane or a boat, motion sensors within the device 100 may measure the device's orientation Φ with respect to gravity G. During operation, an operator manipulates the device's orientation θ with respect to his/her body. As the vehicle moves, the vehicle may change the device's and the operator's orientation Φ with respect to gravity but the device's orientation θ with respect to the operator may change differently (or may not change at all). If the device changes game play based on changes in the device's orientation Φ with respect to gravity G, operators may perceive the device's response as an erroneous response.

Accordingly, the inventors perceive a need in the art for a processing system that distinguishes device orientation changes with respect to a user from the device's orientation changes with respect to gravity.

DETAILED DESCRIPTION

Embodiments of the present invention generate estimates of device motion from two data sources on a computing device—a motion sensor and a camera. The device may compare the estimates to each other to determine if they agree. If they agree, the device may confirm that device motion estimates based on the motion sensor are accurate and may output those estimates to an application within the device. If the device motion estimates disagree, the device may alter the motion estimates obtained from the motion sensor before outputting them to the application.

Figure 1:
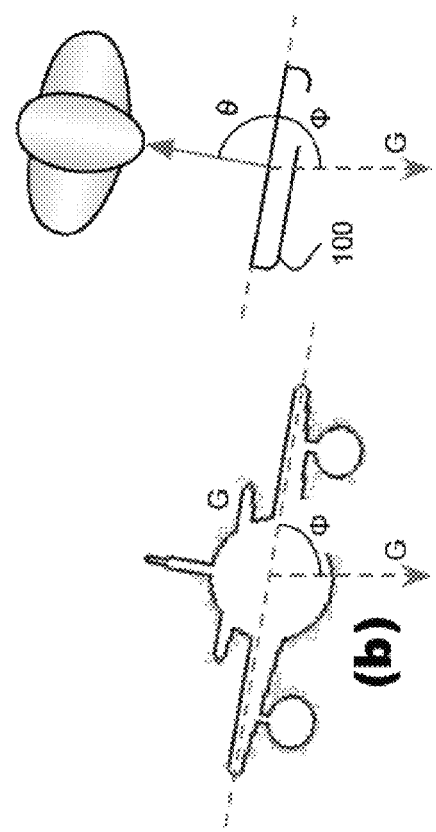
FIG. 1 illustrates a use case in which the orientation of gravitational forces varies about an operator during use of a device.
Figure 1:
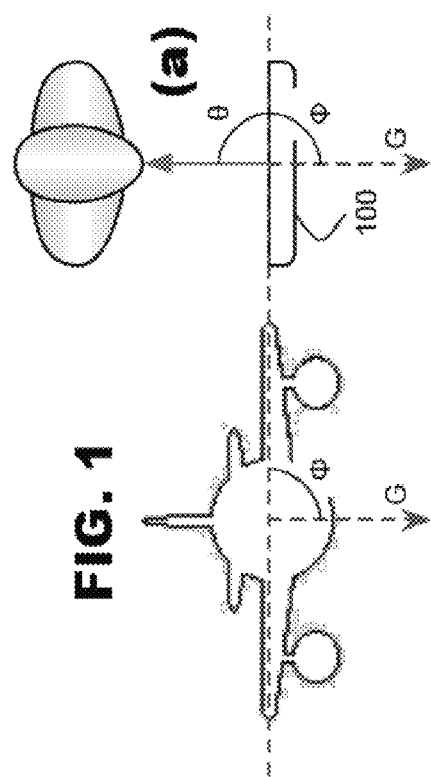
Figure 2:
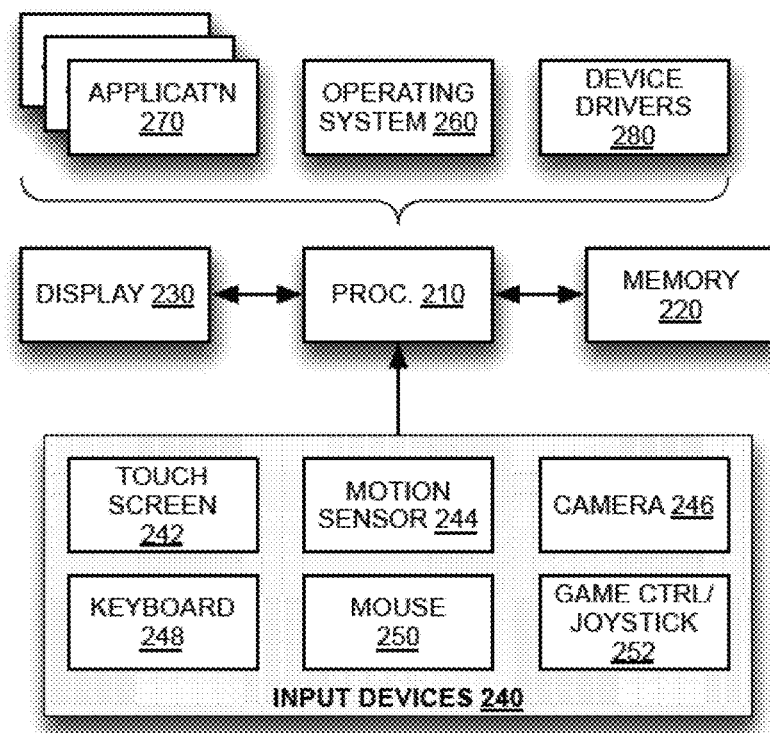
FIG. 2 is a simplified block diagram illustrating components of a computing device according to an embodiment of the present invention.

FIG. 2 is a simplified block diagram illustrating components of a computing device 200. The device 200 may include a processor 210, a memory system 220, a display device 230, and a variety of input devices 240 such as a touch screen 242, motion sensor 244, camera 246, keyboard 248, a mouse 250, and/or a game controller/joystick system 252.

The processor 210 may execute program instructions and process data stored in the memory 220 that define an operating system 260, application(s) 270, and device drivers 280 of the device 200. The operating system 260 and applications 270 may utilize operator input entered through one of the input devices 240 and generate graphical output that may be rendered via the display 230.

The techniques of the present invention find application in a variety of consumer electronic devices, including, for example, tablet computers. Although FIG. 2 illustrates a representative array of input devices 240 that are common to computing devices 200, different devices may employ different combinations of such devices. For example, tablet computers and many smartphones may include a touch screen 242, motion sensor 244 and camera 246 but need not include a dedicated keyboard device 248, mouse 250 or joystick 252. Many gaming platforms may include a camera 246 and game controller 252 with an integrated motion sensor 244 but may not include a dedicated touch screen 242, keyboard, 248, or mouse 250. Accordingly, the configuration of FIG. 2 may be altered to suit different application needs. For the purposes of the present discussion, it is sufficient to note that the principles of the present invention apply to any device 200 that includes a user-controlled motion sensor 244 and a camera 246.

The motion sensor 244 may include a gyroscope and/or accelerometer. The motion sensor 244 may output data at a predetermined sampling rate representing motion from sample to sample. The motion sensor data may be interpreted by components within the motion sensor 244 (e.g., an internal controller) or by the processor 210 as it executes device drivers 280 for the motion sensor 244 to generate motion data representing movement of the motion sensor 244 in free space.

The camera 246 may include a solid-state imaging device and image processor that captures local image information and generates video data therefrom. The camera 246 may be mounted to a housing of the device 200 (not shown) so that an orientation of the camera 246 varies as orientation of the device's housing changes. Thus, as orientation of the camera 246 changes, content of the video data may change accordingly.

As indicated above, embodiments of the present invention may generate estimates of device motion from the motion sensor 244 and the camera 246. The device 200 may compare the estimates to each other to determine if they agree. If they agree, the device 200 may confirm that device motion estimates based on the motion sensor data are accurate and may output those device motion estimates to an application 270 within the device 200. If the device motion estimates disagree, the device 200 may alter the device motion estimates obtained from the motion sensor data before outputting them to the application 270. The video data obtained by the camera 246 need not be output to the application or used otherwise by the device 200 (unless called for by other requirements of the application 270).

Figure 3:
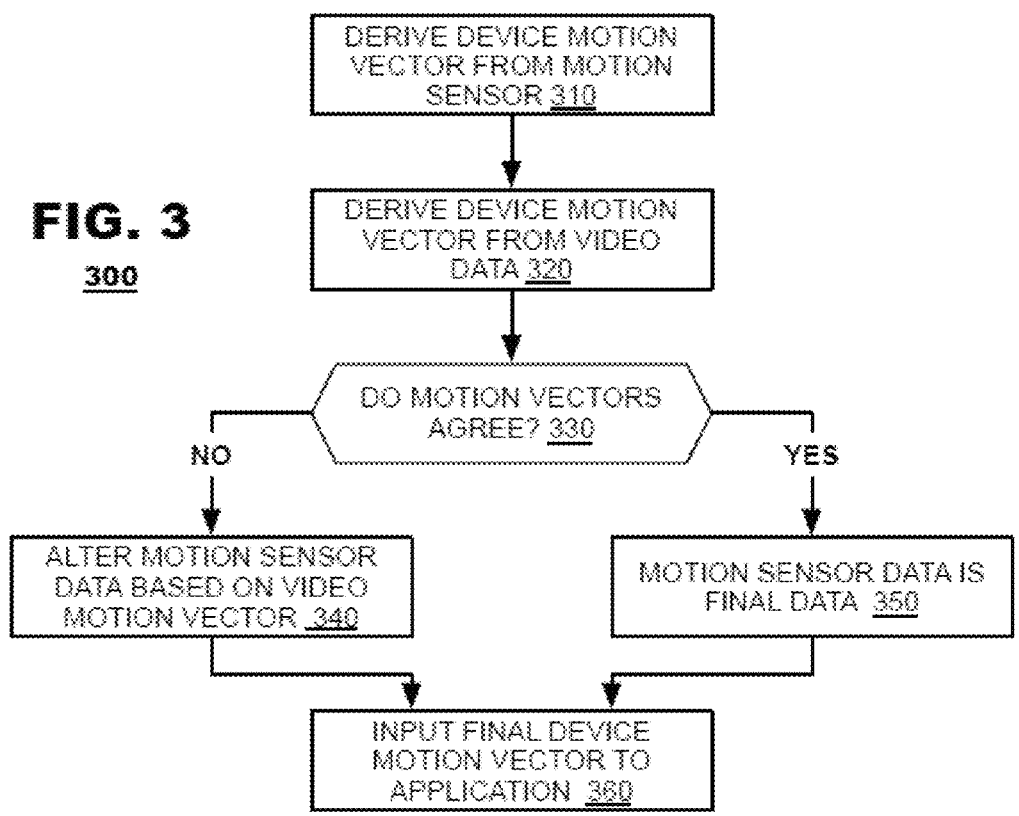
FIG. 3 illustrates a method of operation according to an embodiment of the present invention.

FIG. 3 illustrates a method 300 of operation according to an embodiment of the present invention. The method 300 may generate a first estimate of device orientation or motion based on data output by the motion sensor (box 310). The method 300 also may generate a second estimate of device orientation or motion based from video data output by the camera (box 320). Thereafter, the method 300 may compare the orientation/motion estimates to determine whether the device motion estimates derived from the two sources agree (box 330). If the device motion estimates agree, the method 300 may use the device motion estimate generated from motion sensor data as a final estimate of motion (box 350). If the device motion estimates do not agree, the method 300 may alter the device motion estimate generated from the motion sensor data as a final estimate of device motion (box 340). The method 300 may output the final estimate of device motion for consumption by the operating system and/or the applications as needed (box 360).

Alteration of the device motion estimates may be performed in a variety of ways. In one case, if the device motion estimates obtained from analysis of the video stream indicate the device is not moving at all, the motion data from the sensor may be prevented from being output to the application. In other use cases, the device may derive a scalar from the device motion estimates obtained by analysis of the video stream and may apply the scalar to corresponding device motion estimates obtained from the motion sensor data. The scalar may have a value greater than or less than 1 so that, in cases where the video analysis suggests the device has moved more than has been indicated by the motion sensor data, the device motion estimate may be increased and, in cases where the video analysis suggests the device has moved less than has been indicated by the motion sensor data, the device motion estimate may be decreased accordingly.

Figure 4:
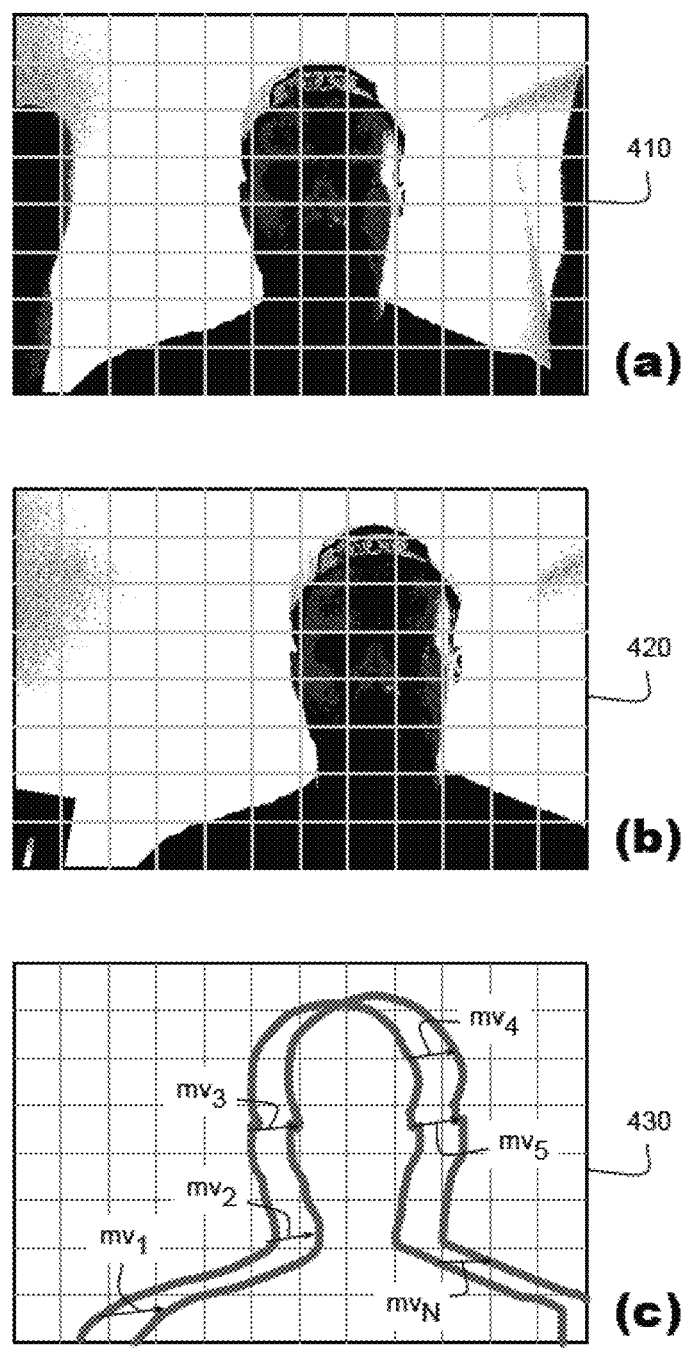
FIG. 4 illustrates exemplary video data that might be captured during operation of a device as it operates in accordance with an embodiment of the present invention.

FIG. 4 illustrates exemplary video data that might be captured during operation of a device 200 as in FIG. 2. FIGS. 4(a) and 4(b) illustrate content of two different frames that might be captured by a camera as the camera operator moves the device to input commands to an application. During operation, a video processing system may perform motion estimation searches of image content from frame-to-frame to estimate motion therein. The searches may be performed on a pixel-by-pixel basis. Alternatively, a frame (say, frame 420 of FIG. 4(b)) may be parsed into pixel blocks, spatial arrays of pixel data, prior to search; motion estimation may be performed on a pixel block basis in this alternative. As a result of the motion estimation search, the method may generate a set of motion vectors, shown as $mv_1$-$mv_N$, for the different elements of image content. The method may generate a motion vector for an entire frame from this set of motion vectors.

The frame motion vector may be generated from any number of mathematical calculations. The method simply may average motion vectors generated from the motion estimation search to generate the frame motion vector. The method may perform histogram-based searches of motion vectors generated from the motion estimation search to estimate numbers of motion vectors that exhibit common motion between them. Further, the calculation of a final motion vector also may assign weights to different elements of image content in order to increase contributions of image content that should be prioritized in calculation of the final motion vector and to decrease contributions of image content that might be deemed unreliable in such calculations. For example, a device may include functionality to perform object detection from image data to detect faces or other objects and their locations. Many applications may use image content of operators for other functions and, therefore, an operator may move his/her location to remain within the center of a field of view notwithstanding movement of the vehicle in which the device is being operated. In such applications, motion vectors of detected objects within a frame might be assigned lower weights than motion vectors of other image content (e.g., a background of the image); movement of background elements may provide better indicators of device motion in this use case than movement of detected objects.

Device motion estimates may be developed as an inverse of the motion vectors obtained from frame content analysis. In the example of FIG. 4, frame content moves generally toward the left in the field of view from frame 410 to frame 420. This represents a shift in camera orientation toward the right of the scene being captured by a camera. The device motion estimate further may consider camera settings being used as the frames 410, 420 are captured, for example, focus length and field of view, to determine a distance between the camera and the scene, which further may be used to refine estimates of the camera's motion in free space.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method of application control, comprising:
    measuring input from a motion sensor affixed to a user input device,
    estimating motion of the user input device from the motion sensor input,
    capturing image data from an imaging device associated with the user input device,
    estimating motion of the user input device from the image data; and
    if the motion of the user input device estimated from the motion sensor input agrees with the motion of the user input device estimated from the image data, then sending the motion of the user input device as estimated from the motion sensor to an application as user input, and
    if the motion estimate obtained from the motion sensor input disagrees with the motion estimate obtained from the image data, then altering the motion estimate obtained from the motion sensor input using the motion estimate obtained from the image data and sending the altered motion estimate to the application as user input.

2. The method of claim 1, further comprising, if the motion estimate obtained from the motion sensor input disagrees with the motion estimate obtained from the image data, then blocking the motion estimate obtained from the motion sensor from being input to the application.

3. The method of claim 1, wherein the method is performed by an operating system of a processing device.

4. The method of claim 1, wherein the motion sensor, imaging device, and application are provided in a common processing device.

5. The method of claim 1, wherein the motion sensor, imaging device, and application are provided in a handheld device.

6. The method of claim 1, wherein the motion sensor and imaging device are provided in a common housing.

7. The method of claim 1, wherein the motion sensor and imaging device are provided in different housings.

8. The method of claim 1, wherein the application is a game.

9. The method of claim 1, further comprising passing the image data to the application as user input.

10. The method of claim 1, wherein the motion estimation based on image data comprises: estimating motion of select pixels between consecutive frames of image data; and averaging the estimated pixel motion.

11. The method of claim 1, wherein the motion estimation based on image data comprises: estimating motion of select pixel blocks between consecutive frames of image data; and averaging the estimated pixel block motion.

12. The method of claim 1, wherein the motion estimation based on image data comprises: identifying object(s) within the image data; and estimating motion of the identified objects between consecutive frames of image data.

13. The method of claim 1, wherein the motion sensor is an accelerometer.

14. The method of claim 1, wherein the motion sensor is a gyroscope.

15. The method of claim 1, wherein the altering comprises: deriving a scalar based on the motion estimate obtained from the image data; and applying the scalar to the motion estimate obtained from the motion sensor input.

16. A processing device comprising:
a processing system,
a memory, storing instructions defining an operating system and at least one application executed by the processing system,
a motion sensor; and
an imaging system, wherein the instructions cause the processing system to estimate the device's motion based on data from the motion sensor and from image data from the imaging system,
wherein the processing system estimates motion of the device from the motion sensor and separately estimates motion of the device from the image data, determines whether the motion estimate obtained from the motion sensor data agrees with the motion estimate obtained from the image data, and
when the motion estimates disagree, altering the motion estimate obtained from the motion sensor based on the motion estimate obtained from the image data, and inputting the altered motion estimate to the application as user input.

17. The device of claim 16, wherein when the motion estimates agree, inputting the motion estimate obtained from the motion sensor to the application as user input.

18. The device of claim 16, wherein when the motion estimates disagree, altering the motion estimate obtained from the motion sensor based on the motion estimate obtained from the image data, and blocking the motion estimate obtained from the motion sensor from being input to the application as user input.

19. The device of claim 16, wherein the motion sensor, imaging device, and application are provided in a common processing device.

20. The device of claim 16, wherein the motion sensor, imaging device, and application are provided in a handheld device.

21. The device of claim 16, wherein the motion sensor and imaging device are provided in a common housing.

22. The device of claim 16, wherein the motion sensor and imaging device are provided in different housings.

23. The device of claim 16, wherein the application is a game.

24. The device of claim 16, wherein the motion sensor is an accelerometer.

25. The device of claim 16, wherein the motion sensor is a gyroscope.

26. The device of claim 16, wherein the altering comprises: deriving a scalar based on the motion estimate obtained from the image data; and applying the scalar to the motion estimate obtained from the motion sensor.

27. A computer readable medium storing program instructions that, when executed by a processor, cause the processor to:
execute an operating system and an application,
estimate motion of a user input device from motion sensor data,
estimate motion of the user input device from image data; and
if the motion of the user input device as estimated from the motion sensor data agrees with the motion of the user input device as estimated from the image data, send the motion of the user input device as estimated from the motion sensor to the application as user input, and
if the motion estimates disagree, alter the motion estimate obtained from the motion sensor based on the motion estimate obtained from the image data, and input the altered motion estimate to the application as user input.

28. The medium of claim 27, wherein, the instructions further cause the processor to block, when the motion estimates disagree, the motion estimate obtained from the motion sensor from being input to the application as user input.

29. The medium of claim 27, wherein, the altering comprises: deriving a scalar based on the motion estimate obtained from the image data; and applying the scalar to the motion estimate obtained from the motion sensor data.

* * * * *